United States Patent
Satpathy et al.

(10) Patent No.: US 9,515,958 B2
(45) Date of Patent: *Dec. 6, 2016

(54) ACCESSING A CLOUD-BASED SERVICE USING A COMMUNICATION DEVICE LINKED TO ANOTHER COMMUNICATION DEVICE VIA A PEER-TO-PEER AD HOC COMMUNICATION LINK

(71) Applicant: GOOGLE TECHNOLOBY HOLDINGS LLC, Mountain View, CA (US)

(72) Inventors: Ansuman Satpathy, Sunnyvale, CA (US); Haitang Wang, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/711,941

(22) Filed: May 14, 2015

(65) Prior Publication Data
US 2015/0244644 A1 Aug. 27, 2015

Related U.S. Application Data

(63) Continuation of application No. 13/835,353, filed on Mar. 15, 2013, now Pat. No. 9,038,195.

(51) Int. Cl.
*H04L 29/06* (2006.01)
*H04L 12/927* (2013.01)
(Continued)

(52) U.S. Cl.
CPC .......... *H04L 47/808* (2013.01); *H04L 63/083* (2013.01); *H04L 63/0853* (2013.01); *H04L 67/10* (2013.01);
(Continued)

(58) Field of Classification Search
CPC .................................................. H04L 63/0853
See application file for complete search history.

(56) References Cited

U.S. PATENT DOCUMENTS 8,646,060 B1 2/2014 Ben Ayed
8,701,157 B1 * 4/2014 Wilson .................... H04L 63/08
726/1

(Continued)

FOREIGN PATENT DOCUMENTS

EP 1912413 A1 4/2008
EP 2490165 A1 8/2012

OTHER PUBLICATIONS

Madsen, P. et al., "Liberty ID-WSF Muti-Device SSO Deployment Guide," Liberty Alliance Project, Version 1.0-02, AOL LLC et al., (c) 2008, 13 pg.
(Continued)

*Primary Examiner* — Shawnchoy Rahman

(57) ABSTRACT

Arrangements described herein relate to accessing a cloud based service. Responsive to a user of a first communication device initiating access to the cloud based service via the first communication device, a prompt for a valid password to be entered to access the cloud based service can be received by the first communication device. Responsive to the valid password required to access the cloud based service not being stored on the first communication device, the first communication device can automatically retrieve the valid password from a second communication device via a peer-to-peer ad hoc communication link between the first communication device and the second communication device. The valid password can be automatically provided, by the first communication device, to a login service for the cloud based service to obtain access by the first communication device to the cloud based service.

20 Claims, 3 Drawing Sheets

(51) Int. Cl.
  *H04W 12/00* (2009.01)
  *H04W 12/04* (2009.01)
  *H04W 12/06* (2009.01)
  *H04L 29/08* (2006.01)
  *H04W 84/18* (2009.01)

(52) U.S. Cl.
  CPC ............ *H04W 12/00* (2013.01); *H04W 12/04* (2013.01); *H04W 12/06* (2013.01); *H04W 84/18* (2013.01)

(56) References Cited

U.S. PATENT DOCUMENTS

| | | | |
|---|---|---|---|
| 8,775,794 B2 | 7/2014 | Benson | |
| 8,776,188 B2 | 7/2014 | Manion et al. | |
| 8,990,389 B2 * | 3/2015 | Rowe | G06F 17/30867 709/224 |
| 2006/0185004 A1 | 8/2006 | Song et al. | |
| 2007/0113277 A1 | 5/2007 | Chiang | |
| 2008/0098468 A1 * | 4/2008 | Cortopassi | G07C 9/00182 726/5 |
| 2010/0262828 A1 | 10/2010 | Brown et al. | |
| 2010/0274859 A1 * | 10/2010 | Bucuk | H04L 63/08 709/206 |
| 2011/0099616 A1 | 4/2011 | Mazur et al. | |
| 2013/0029597 A1 | 1/2013 | Liu et al. | |
| 2013/0067229 A1 | 3/2013 | German et al. | |
| 2013/0174223 A1 | 7/2013 | Dykeman et al. | |
| 2014/0181529 A1 | 6/2014 | Joyce, III | |
| 2014/0181691 A1 | 6/2014 | Poornachandran et al. | |

OTHER PUBLICATIONS

International Search Report and Written Opinion for PCT Application No. PCT/US2014/028010 dated Aug. 7, 2014; 9 pgs.

* cited by examiner

200

```
┌─────────────────────────────────────────────────────────────┐
│ Responsive to a user of a first communication device        │
│ initiating access to the cloud based service via the first  │
│ communication device, receive by the first communication    │
│ device a prompt for a valid user name and/or password to be │
│ entered to access the cloud based service                    │
│ 205                                                          │
└─────────────────────────────────────────────────────────────┘
                              │
                              ▼
┌─────────────────────────────────────────────────────────────┐
│ Responsive to the valid user name and/or password required   │
│ to access the cloud based service not being stored on the    │
│ first communication device, the first communication device,  │
│ via a processor, automatically retrieves the valid user name │
│ and/or password from a second communication device via a     │
│ peer-to-peer ad hoc communication link between the first     │
│ communication device and the second communication device     │
│ 210                                                          │
└─────────────────────────────────────────────────────────────┘
                              │
                              ▼
┌─────────────────────────────────────────────────────────────┐
│ Automatically provide, by the first communication device,    │
│ the valid user name and/or password to a login service of    │
│ the cloud based service to obtain access by the first        │
│ communication device to the cloud based service              │
│ 215                                                          │
└─────────────────────────────────────────────────────────────┘
                              │
                              ▼
┌─────────────────────────────────────────────────────────────┐
│ The first communication device terminates a first user       │
│ session with the cloud based service                         │
│ 220                                                          │
└─────────────────────────────────────────────────────────────┘
                              │
                              ▼
┌─────────────────────────────────────────────────────────────┐
│ Responsive to the first communication device terminating the │
│ first user session with the cloud based service, a second    │
│ user session established between the second communication    │
│ device and the cloud based service is automatically          │
│ terminated                                                   │
│ 225                                                          │
└─────────────────────────────────────────────────────────────┘
```

FIG. 2

ACCESSING A CLOUD-BASED SERVICE USING A COMMUNICATION DEVICE LINKED TO ANOTHER COMMUNICATION DEVICE VIA A PEER-TO-PEER AD HOC COMMUNICATION LINK

CROSS-REFERENCE TO RELATED APPLICATIONS

This application is a continuation of U.S. patent application Ser. No. 13/835,353, filed Mar. 15, 2013, now U.S. Pat. No. 9,038,195, entitled "Accessing a Cloud-Based Service Using a Communication Device Linked to Another Communication Device Via a Peer-to-Peer Ad Hoc Communication Link," which is herein incorporated by reference.

BACKGROUND OF THE INVENTION

Cloud computing is the use of computing resources (hardware and software) delivered as a service over a network, such as the Internet. In a business model using software as a service, users are provided access to application software and databases via cloud computing. The service providers manage the infrastructure and platforms on which the applications run. In addition to software as a service, other cloud based services commonly are available to users, for example social networking services, banking services, e-mail services, instant messaging services, data storage services, etc. Typically these services require a user name and password to be authenticated before a user can use the services.

BRIEF DESCRIPTION OF THE DRAWINGS

FIG. 2 is a flowchart presenting a method of accessing a cloud based service, which is useful for understanding various arrangements described herein.

DETAILED DESCRIPTION

Figure 1:
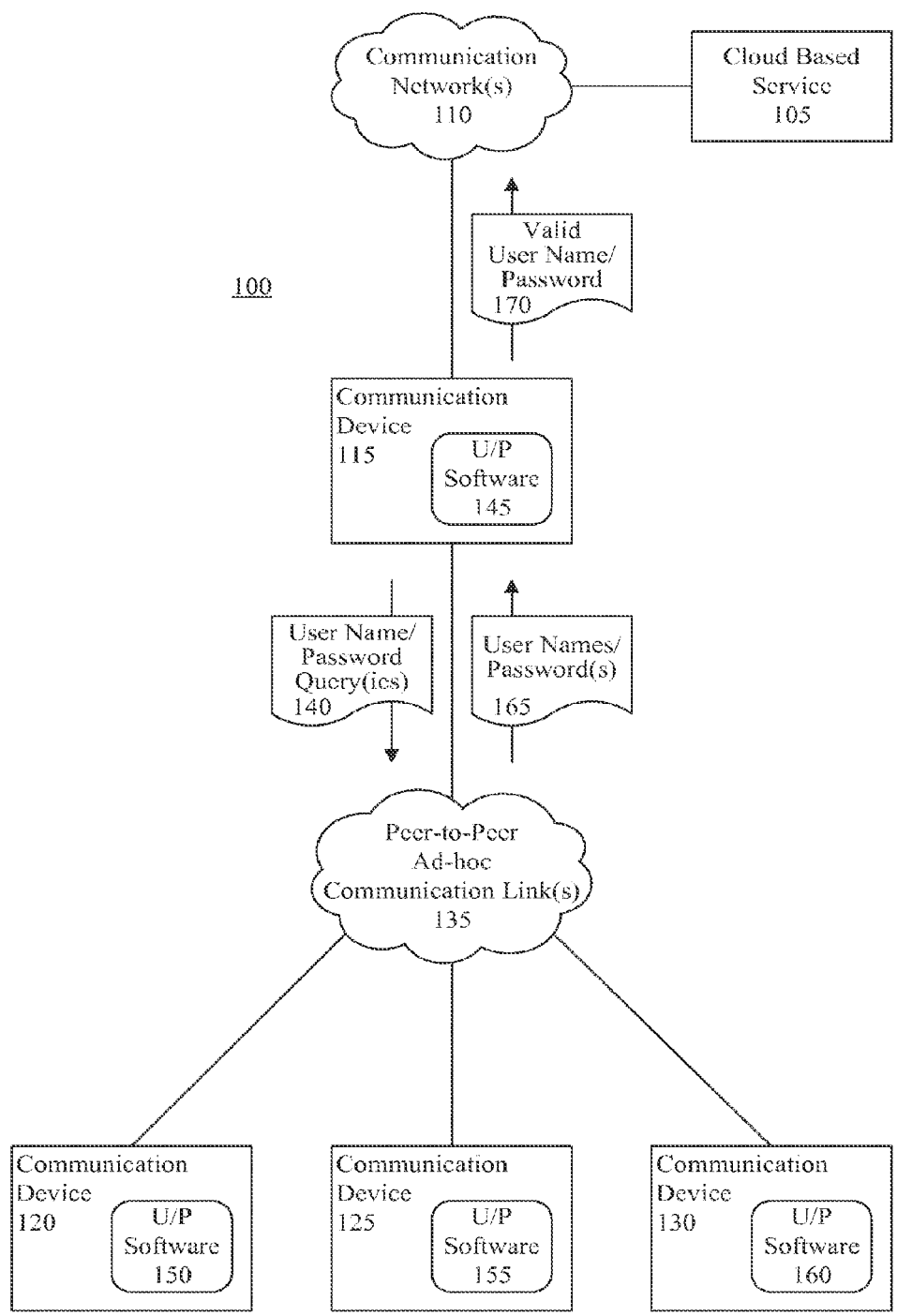
FIG. 1 depicts a system for accessing a cloud based service, which is useful for understanding various arrangements described herein.

While the specification concludes with claims defining features of the embodiments described herein that are regarded as novel, it is believed that these embodiments will be better understood from a consideration of the description in conjunction with the drawings. As required, detailed arrangements of the present embodiments are disclosed herein; however, it is to be understood that the disclosed arrangements are merely exemplary of the embodiments, which can be embodied in various forms. Therefore, specific structural and functional details disclosed herein are not to be interpreted as limiting, but merely as a basis for the claims and as a representative basis for teaching one skilled in the art to variously employ the present embodiments in virtually any appropriately detailed structure. Further, the terms and phrases used herein are not intended to be limiting but rather to provide an understandable description of the present arrangements.

As will be appreciated by one skilled in the art, aspects of the present arrangements may be embodied as a system, method or computer program product. Accordingly, aspects of the present arrangements may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present arrangements may take the form of a computer program product embodied in one or more computer-readable medium(s) having computer-readable program code stored thereon. The computer-readable program code may be executable by a processor (e.g., a central processing unit or a controller) to perform the processes and methods described herein.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's communication device, partly on the user's communication device, as a stand-alone software package, partly on the user's communication device and partly on a remote communication device, or entirely on the communication device or server.

Aspects of the present arrangements are described below with reference to a flowchart illustration and/or block diagrams of methods, apparatus (systems), and computer program products according to embodiments of the present arrangements. It will be understood that each block of the flowchart illustration and/or block diagrams, and combinations of blocks in the flowchart illustrations and/or block diagrams, can be implemented by computer program instructions. These computer program instructions may be provided to a processor of a communication device, or other programmable data processing apparatus to produce a machine, such that the instructions, which execute via the processor of the communication device, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

While only certain features of the invention have been illustrated and described herein, many modifications and changes will occur to those skilled in the art. It is, therefore, to be understood that the appended claims are intended to cover all such modifications and changes as fall within the true spirit of the invention.

The computer program instructions may also be loaded onto a communication device, other programmable data processing apparatus, or other devices to cause a series of operational steps to be performed on the communication device, other programmable apparatus or other devices to produce a processor implemented process such that the instructions which execute on the communication device or other programmable apparatus provide processes for implementing the functions/acts specified in the flowchart and/or block diagram block or blocks.

Arrangements described herein relate to accessing a cloud based service. The cloud based service can provide software as service, a social networking service, a banking service, an electronic mail service, an instant messaging service, a data storage service, or any other software based service accessible via a communication network.

The cloud based service can be accessed using a first communication device linked to one or more other communication devices via a peer-to-peer ad hoc communication link. Responsive to a user of a first communication device initiating access to the cloud based service via the first communication device, a prompt for a valid user name and/or valid password to be entered to access the cloud based service can be received by the first communication device. Responsive to the valid password and/or user name required to access the cloud based service not being stored on the first communication device, the first communication device can automatically retrieve the valid password and/or user name from a second communication device via the peer-to-peer ad hoc communication link between the first communication device and the second communication device. The valid password and/or user name can be automatically provided to the cloud based service to obtain access to the cloud based service. For example, using the automatically retrieved password and/or user name, the first communication device can establish a user session with the cloud based service.

In view of the foregoing, the user need not complete a series of redundant and time consuming tasks related to entering the user name and/or password to access the cloud based service. Instead, the user name and/or password can be automatically entered on behalf of the user, even when the user name and/or password are not stored on the first communication device via which the user is attempting to access the cloud based service. This provides an improved user experience for the user.

Several definitions that apply throughout this document will now be presented.

As used herein, the term ad hoc network means a decentralized type of wireless network that does not rely on, but can use, a preexisting infrastructure such as routers in wired networks or access points in managed (infrastructure) wireless networks, to communicate data. Instead of relying on the preexisting infrastructure, each node of an ad hoc network can participate in routing of data by forwarding the data to/for other nodes, so the determination of which nodes forward data is made dynamically on the basis of network connectivity. In addition to the classic routing, ad hoc networks can use flooding for forwarding the data. The mode of operation of IEEE 802.11 wireless networks is consistent with an ad hoc network, as is the operation of personal area networks (PANs), such as Bluetooth®, Zig-Bee®, near field communication (NFC), and the like.

As used herein, the term "ad hoc communication link" means a wireless communication link established via an ad hoc network, for example via an IEEE 802.11 wireless communication link, via a PAN communication link or via a NFC link.

As used herein, the term "peer-to-peer means" means that communication devices have equal status on a communication network and are free to associate with any other communication devices on the communication network in a communication link range, for example using ad hoc communication links.

As used herein, the term "communication device" means a device comprising a processor (e.g., a central processing unit, a controller, or the like) and memory configured to communicate with other devices via a communication network. Examples of communication devices include, but are not limited to, computers (e.g., workstations, desktop computers, mobile computers, laptop computers, tablet computers, or the like), personal digital assistants, mobile phones, smart phones, etc.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

FIG. 1 depicts a system 100 for accessing a cloud based service, which is useful for understanding various arrangements described herein. The system can include a cloud based service 105 accessible via one or more communication networks 110. The communication network(s) 110 can be implemented as, or include, any of a variety of different public and/or private networks such as a wide area network (WAN), a local area network (LAN), a wireless network, a mobile network (e.g., a cellular communication network), a Virtual Private Network (VPN), the Internet, a Public Switched Telephone Network (PSTN), or the like.

In operation, a user, using a communication device 115, can initiate access to the cloud based service 105 via the communication network(s) 110. In response, the cloud based service 105, or another service tasked with authenticating the user, can prompt the user to enter a user name and/or password. The communication device 115 can determine whether a corresponding user name and/or password are stored on the communication device. If so, the communication device 115 can communicate the user name and/or password to the cloud based service 105 (or another service tasked with authenticating the user for the cloud based service) for user authentication. If the user authentication fails, the user name and/or password stored on the communication device 115 can be determined to be invalid.

If the user name and/or password stored on the communication device 115 are determined to be invalid, or a corresponding user name and/or password are not stored on the communication device 115, the communication device 115 can attempt to retrieve a valid user name and/or password from one or more other communication devices 120, 125, 130 via respective peer-to-peer ad hoc communication links (hereinafter "communication links") 135. The communication links 135 can be IEEE 802.11 communication links, PAN communication links, NFC links, or any other suitable peer-to-peer ad hoc communication links. The other communication devices 120, 125, 130 can be communication devices which the user may have previously used to access the cloud based service 105, and thus may have stored thereon a valid user name and/or password required to access the cloud based service 105.

The communication devices 120-130 can be identified by the communication device 115 by virtue of the ability of the communication device 115 to establish the communication links 135 with the communication devices 120-130 and/or the communication devices 120-130 being located proximate to the communication device 115. For example, responsive to the valid user name and/or password required to access the cloud based service 105 not being stored on the communication device 115, the communication device 115 can automatically initiate establishment of the communication link(s) 135 between the communication device 115 and one or more of the communication devices 120-130 and/or identify existing communication links 135 between the communication device 115 and one or more of the communication devices 120-130.

In illustration, the communication device 115 can execute user name/password (U/P) software 145, for example a suitable application, plug-in or module. The U/P software 145 can scan the communication device 115 to identify any presently established communication links 135 with one or more of the communication devices 120-130. The U/P software 145 also can scan the communication device 115 to identify any saved settings for communication links 135 which are not presently established, and initiate the communication device 115 to attempt to establish such communication links 135 with one or more of the communication devices 120-130. When the communication device 115 is able to establish communication links 135 with the communication devices 120-130, for example establishing PAN or NFC communication links 135 with the communication devices 120-130, or the communication devices 120-130 are on the same network or subnet as the communication device 115, the communication devices 120-130 can be determined to be located proximate to the first communication device 115.

When one or more of the communication links 135 are identified and/or established, the U/P software 145 can communicate the respective query or queries 140 via the communication link(s) 135 to the one or more communication devices 120-130. The queries 140 can identify the cloud based service 105, the user who is attempting to access the cloud based service 105, and request a valid user name and/or password required to access the cloud based service 105 on behalf of the user. This process can be responsive to identifying and/or establishing the communication links 135 and/or responsive to determining that the other communication devices 120-130 are located proximate to the communication device 115.

Each of the communication devices 120-130 also can execute respective U/P software 150, 155, 160. On each communication device 120-130, the respective U/P software 150-160 can receive and process the respective query 140 to identify the last known valid user name and/or password 165 for the cloud based service 105, which may be stored on that communication device 120-130, and communicate such user name/password 165 to the communication device 115. Accordingly, the communication device 115 can receive one or more sets of user names/passwords 165, one set from each communication device 120-130.

If the sets of user names/passwords 165 match (e.g., each user name and each password are the same), the U/P software 145 can determine that the user name/password 165 is valid, and use that user/name password as the valid user name/password 170 to be used to login to the cloud based service 105. If the sets of user names/passwords 165 do not match, the U/P software 145 can identify the most recent user name/password 165, and assume that they are valid. For example, each user name/password 165 provided by a respective communication device 120-130 can have an associated time stamp from when the user name/password 165 was last used to access the cloud based service 105 or validated by the cloud based service 105 (or a corresponding login service), and the U/P software 145 can select the user name/password 165 with the most recent time stamp as the valid user name/password 170 based on that time stamp.

Once the U/P software 145 has selected the valid user name/password, the U/P software 145 can provide the valid user name and/or password 170 to the cloud based service 105 (or a corresponding login service) to log the user/communication device 115 into the cloud based service 105, thus obtaining access by the communication device 115 to the cloud based service 105 on behalf of the user. For example a first user session can be established with the cloud based service 105 via the communication device 115. Accordingly, the user can access the cloud based service using the communication device 115.

In one non-limiting arrangement, when the user of the communication device 115 initiates access to the cloud based service 105 via the communication device 115, the user may have one or more other user sessions opened with the cloud based service 105 via one or more of the communication devices 120-130. Thus, one or more of the communication devices 120-130 presently may have access to the cloud based service 105. For example, the user may be working on a desktop computer (e.g., communication device 120) in the user's home office, and establish a user session (hereinafter "second user session") with the cloud based service 105. The user then may move to the user's family room, pick up a tablet computer (e.g., communication device 115), and initiate access to the cloud based service 105 using the tablet computer. Hence, a first user session can be established with the cloud based service 105 via the tablet computer, wherein the tablet computer obtains the valid user name/password from the desktop computer in accordance with the process described above.

When the communication device 115 terminates the user session, for example the user closes the first user session by logging out of the cloud based service 105 or closing an application used for the first user session (e.g., a web browser, an e-mail client, a messaging client, etc.), the U/P software 145 of the communication device 115 can communicate a message to the U/P software 150 of the communication device 120 indicating to the U/P software 150 close the second user session. In response, the U/P software 150 can close the second user session on the communication device 120, for example by logging out of the cloud based service 105 or closing an application used for the second user session. If one or more other user sessions with the cloud based service 105 exist via the communication devices 125-130, the respective U/P software 155-160 can receive respective messages from the U/P software 145 to close such user sessions and, in response, the U/P software 155-160 can close such user sessions in a similar manner.

When the first user session is terminated, the communication device 115 can delete the valid user name and/or password 170 received from at least one of the communication devices 120-130, though this need not be the case. For instance, the valid user name and/or password 170 can be stored only temporarily to establish the first user session. Whether to delete the valid user name and/or password 170 after the first user session is terminated, or persist the valid user name and/or password 170 to a machine-readable storage (e.g., store so that the valid user name and/or password 1700 will be available at a later time), can be based on a user setting in the U/P software 145.

The U/P software 145-160 can implement any suitable form of security settings so that the valid user name and/or password 170 only will be retrieved by the communication device 115 when the appropriate user is logged into the communication device 115, for example using the user's credentials (e.g., user name, password, finger print, etc.) to log into the communication device 115 and/or the U/P software 145.

FIG. 2 is a flowchart presenting a method 200 of accessing a cloud based service, which is useful for understanding various arrangements described herein. At step 205, responsive to a user of a first communication device initiating access to the cloud based service via the first communication device, a prompt for a valid user name and/or password to be entered to access the cloud based service is received by the first communication device.

At step 210, responsive to the valid user name and/or password required to access the cloud based service not being stored on the first communication device, the first communication device, via a processor, can automatically retrieve the valid user name and/or password from a second communication device via a peer-to-peer ad hoc communication link between the first communication device and the second communication device. As noted, the first communication device can scan for one or more existing peer-to-peer ad hoc communication links, for example an existing communication link between the first and second communication devices, or initiate the first communication device to establish one or more peer-to-peer ad hoc communication links, for example a communication link between the first and second communication devices. At step 215, the valid user name and/or password can be automatically provided, by the first communication device, to a login service of the cloud based service to obtain access by the first communication device to the cloud based service. Thus, a first user session can be established.

Sometime after using the cloud based service, the user may decide to terminate the first user session. Thus, at step 220, the first communication device can terminate the first user session with the cloud based service. At step 225, responsive to the first communication device terminating the first user session with the cloud based service, a second user session established between the second communication device and the cloud based service can be automatically terminated.

Figure 3:
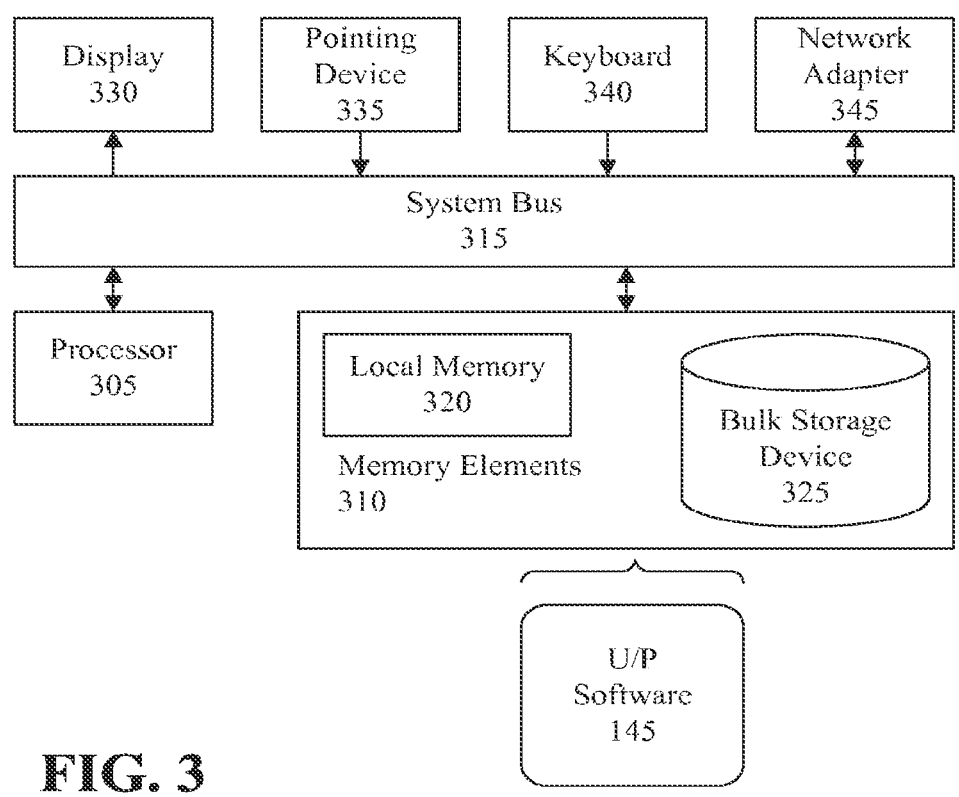
FIG. 3 depicts a block diagram of a communication device, which is useful for understanding various arrangements described herein.

FIG. 3 is a block diagram depicting an example arrangement of the communication device 115 of FIG. 1, which is useful for understanding various arrangements described herein. The communication devices 120-130 of FIG. 1 can be configured in a similar manner.

The communication device 115 can include at least one processor 305 (e.g., a central processing unit or controller) coupled to memory elements 310 through a system bus 315 or other suitable circuitry. As such, the communication device 115 can store program code within the memory elements 310. The processor 305 can execute the program code accessed from the memory elements 310 via the system bus 315. It should be appreciated that the communication device 115 can be implemented in the form of any system including a processor and memory that is capable of performing the functions and/or operations described within this specification.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as computer-readable storage medium(s), such as a hard disk drive (HDD), solid state drive (SSD), or other persistent data storage device. The communication device 115 also can include one or more cache memories (not shown) that provide temporary storage of at least some program code in order to reduce the number of times program code must be retrieved from the bulk storage device 325 during execution.

Input/output (I/O) devices such as a display 330, a pointing device 335 and, optionally, a keyboard 340 can be coupled to the communication device 115. The I/O devices can be coupled to the communication device 115 either directly or through intervening I/O controllers. For example, the display 330 can be coupled to the communication device 115 via a graphics processing unit (GPU), which may be a component of the processor 305 or a discrete device. One or more network adapters 345 also can be coupled to communication device 115 to enable the communication device 115 to become coupled to other communication devices, systems, computer systems, remote printers, and/or remote storage devices through intervening private or public networks or directly via a PAN. Modems, cable modems, transceivers, and Ethernet cards are examples of different types of network adapters 345 that can be used with communication device 115.

As pictured in FIG. 3, the memory elements 310 can store the components of the communication device 115, namely the U/P software 145. Being implemented in the form of executable program code, the U/P software 145 can be executed by the communication device 115 and, as such, can be considered part of the communication device 115. Moreover, the U/P software 145 is functional data structure that imparts functionality when employed as part of the communication device 115 of FIG. 1. The queries 140, user names/passwords 165 and valid user name/password 170 of FIG. 1 also are functional data structures that impart functionality when processed by and/or generated by the communication device 115 of FIG. 1.

Like numbers have been used to refer to the same items throughout this specification. The terminology used herein is for the purpose of describing particular embodiments only and is not intended to be limiting of the invention. The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one arrangement," "an arrangement," or similar language means that a particular feature, structure, or characteristic described in connection with the embodiment is included in at least one arrangement disclosed within this specification. Thus, appearances of the phrases "in one arrangement," "in an arrangement," and similar language throughout this specification may, but do not necessarily, all refer to the same arrangement.

The term "plurality," as used herein, is defined as two or more than two. The term "another," as used herein, is defined as at least a second or more. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Moreover, as used herein, ordinal terms (e.g. first, second, third, fourth, and so on) distinguish one communication device, software, application, communication link, process, and the like from another communication device, software, application, communication link, process and the like. Thus, an ordinal term used herein need not indicate a specific position in an ordinal series. For example, a process identified as a "second process" may occur before a touch sensor identified as a "first process." Further, one or more processes may occur between a first process and a second process.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

These embodiments can be embodied in other forms without departing from the spirit or essential attributes thereof. Accordingly, reference should be made to the following claims, rather than to the foregoing specification, as indicating the scope of the embodiments.

The invention claimed is:

1. A method, comprising:
   in response to a first communication device generating and transmitting a request to access a computing system, receiving a first reply at the first communication device, wherein the first reply comprises a request for authentication data to be entered on the first communication device to access the computing system;
   determining whether the authentication data is stored on the first communication device;
   querying a second communication device for the authentication data when the authentication data is determined not to be stored on the first communication device;
   receiving the authentication data from the second communication device when the authentication data is stored on the second communication device; and
   providing the authentication data from the first communication device to access the computing system.

2. The method of claim 1, wherein generating and transmitting the request to access the computing system comprises generating and transmitting a request to access a cloud based service.

3. The method of claim 1, further comprising determining whether the authentication data is valid or invalid when the authentication data is stored on the first communication device.

4. The method of claim 3, further comprising querying the second communication device for the authentication data when the authentication data stored on the first communication device is determined to be invalid.

5. The method of claim 1, further comprising establishing a peer-to-peer ad hoc communication link between the first communication device and the second communication device prior to querying the second communication device for the authentication data.

6. The method of claim 5, wherein establishing the peer-to-peer ad hoc communication link between the first communication device and the second communication device comprises automatically establishing the peer-to-peer ad hoc communication link when the second communication device is located proximate to the first communication device.

7. The method of claim 1, wherein querying the second communication device for the authentication data comprises querying a plurality of external communication devices for the authentication data.

8. An electronic device, comprising;
   a processor configured to:
      receive a first request, wherein the first request comprises a request for authentication data to be entered on the electronic device to access a computing system;
      determine whether the authentication data is stored on the electronic device;
      query a second electronic device for the authentication data when the authentication data is determined not to be stored on the electronic device;
      receive the authentication data from the second electronic device when the authentication data is stored on the second electronic device; and
      provide the authentication data to access the computing system.

9. The electronic device of claim 8, wherein the processor is configured to establish a peer-to-peer ad hoc communication link with the second electronic device upon determining that the authentication data is not stored on the electronic device.

10. The electronic device of claim 9, wherein the processor is configured to establish the peer-to-peer ad hoc communication link with the second electronic device based at least in part on whether the second electronic device is located proximate to the electronic device.

11. The electronic device of claim 8, wherein the second electronic device is configured to access the computing system prior to the electronic device accessing the computing system.

12. The electronic device of claim 8, wherein the processor is configured to query a plurality of external electronic devices for the authentication data, wherein the plurality of external electronic devices includes the second electronic device.

13. The electronic device of claim 8, wherein the processor is configured to:
query a third electronic device for the authentication data; and
receive a second authentication data from the third electronic device.

14. The electronic device of claim 13, wherein the processor is configured to compare the authentication data to the second authentication data to determine a validity of the authentication data or the second authentication data.

15. The electronic device of claim 14, wherein the processor is configured to determine the validity of the authentication data or the second authentication data based at least in part on one or more time stamps associated with the authentication data and the second authentication data.

16. The electronic device of claim 8, wherein the processor is configured to provide a prompt for a user of the electronic device to provide authorization data on the electronic device before the electronic device receives the authentication data from the second electronic device.

17. The electronic device of claim 8, wherein the authentication data comprises a username, a password, or a combination thereof.

18. A non-transitory computer-readable medium having computer executable code stored thereon, the code comprising instructions to:
cause a processor of a communication device to receive a first request, wherein the first request comprises a request for authentication data to be entered on the communication device to access a computing system;
cause the processor to determine whether the authentication data is stored on the communication device;
cause the processor to query a second communication device for the authentication data when the authentication data is determined not to be stored on the communication device;
cause the processor to receive the authentication data from the second communication device when the authentication data is stored on the second communication device; and
cause the processor to provide the authentication data to access the computing system.

19. The non-transitory computer-readable medium of claim 18, wherein the code further comprises instructions to cause the processor to establish a first peer-to-peer ad hoc communication link with the second communication device and a second peer-to-peer ad hoc communication link with a third communication device upon determining that the authentication data is not stored on the communication device.

20. The non-transitory computer-readable medium of claim 18, wherein the code further comprises instructions to:
cause the processor to query the second communication device and a third communication device for the authentication data; and
cause the processor to receive the authentication data from the second communication device or the third communication device when the authentication data is stored on the second communication device or the third communication device.

* * * * *